US009729571B1

(12) United States Patent
Ferguson et al.

(10) Patent No.: US 9,729,571 B1
(45) Date of Patent: Aug. 8, 2017

(54) SYSTEM, METHOD, AND COMPUTER PROGRAM FOR DETECTING AND MEASURING CHANGES IN NETWORK BEHAVIOR OF COMMUNICATION NETWORKS UTILIZING REAL-TIME CLUSTERING ALGORITHMS

(71) Applicant: Amdocs Software Systems Limited, Dublin (IE)

(72) Inventors: Paul Andrew Ferguson, Dublin (IE); Roman Ferrando Llopis, Dublin (IE); Peter John Cogan, Dublin (IE)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 76 days.

(21) Appl. No.: 14/815,715

(22) Filed: Jul. 31, 2015

(51) Int. Cl.
*H04L 29/06* (2006.01)
*H04L 12/715* (2013.01)

(52) U.S. Cl.
CPC .......... *H04L 63/1441* (2013.01); *H04L 45/46* (2013.01); *H04L 63/1408* (2013.01); *H04L 63/306* (2013.01)

(58) Field of Classification Search
CPC ................. H04L 63/14; H04L 63/1408; H04L 63/1416; H04L 63/1425; H04L 63/1433; G06F 21/51; G06F 21/552; G06F 21/554
See application file for complete search history.

(56) References Cited

U.S. PATENT DOCUMENTS

| 7,945,668 | B1 * | 5/2011 | Nucci | G06K 9/622 |
| | | | | 707/999.001 |
| 2010/0071061 | A1 * | 3/2010 | Crovella | H04L 63/1425 |
| | | | | 726/23 |
| 2010/0153316 | A1 | 6/2010 | Duffield et al. | |
| 2012/0281590 | A1 | 11/2012 | Szabo et al. | |

OTHER PUBLICATIONS

Portnoy, L. "Intrusion detection with unlabeled data using clustering," 2001, pp. 1-25.
Wang, Q. et al., "A clustering algorithm for intrusion detection," 2005, pp. 1-8.
Zander, S. et. al. "Automated Traffic Classification and Application Identification using Machine Learning," LCN'05, 2005, pp. 1-8.
Zhang, H. et al., "Feature selection for optimizing traffic classification," Computer Communications, vol. 35, 2012, pp. 1457-1471.

(Continued)

*Primary Examiner* — Edward Zee
(74) *Attorney, Agent, or Firm* — Zilka-Kotab, PC

(57) ABSTRACT

A system, method, and computer program product are provided for detecting and measuring changes in network behavior of communication networks utilizing real-time clustering algorithms. In use, network traffic associated with at least one communication network is received. Additionally, the network traffic is characterized and classified based on similarities in the network traffic utilizing one or more real-time clustering algorithms. Further, changes in network behavior of the at least one communication network are detected and measured utilizing information associated with the classified network traffic.

15 Claims, 13 Drawing Sheets

(56) References Cited

OTHER PUBLICATIONS

Zhao, W. et al., "Parallel K-Means clustering based on MapReduce," CloudCom, 2009, p. 674-679.
Wang, Y. et al., "Automatic Application Signature Construction from Unknown Traffic," 2010 24th IEEE International Conference on Advanced Information Networking and Applications, 2010, pp. 1115-1120.
Lisi, F. A. et al., Inducing multi-level association rules from multiple relations, Machine Learning, vol. 55, 2004, pp. 175-210.
Mcgregor, A. et al., "Flow Clustering Using Machine Learning Techniques," 2004, pp. 1-10.
Nguyen, T. T. T. et. al., "A Survey of Techniques for Internet Traffic Classification using Machine Learning," Communications Surveys and Tutorials, 2008, pp. 1-21.
Sen, S. et al., "Accurate, Scalable In-Network Identication of P2P Traffic Using Application Signatures," WWW2004, May 17-22, 2004, pp. 1-10.
"AURORA: Traffic analysis and visualization," IBM, 2006, pp. 1-3, retrieved from http://www.zurich.ibm.com/aurora/.
"Centralized Management, Reporting & Analytics," Dell, 2014, pp. 1-3, retrieved from https://www.sonicwall.com/us/en/products/ATA.html.
"Cisco IOS NetFlow," Cisco, 2014, pp. 1-2, retrieved from http://www.cisco.com/c/en/us/products/ios-nx-os-software/ios-netflow/index.htm.
"Icons-Land," 2006, pp. 1-21, retrieved from http://www.icons-land.com/.
Aggarwal, C. et. al. "A Framework for Clustering Evolving Data Streams," Proceedings of the 29th VLDB Conference, Sep. 2003, pp. 1-12.
Aggarwal, C. et. al. "A Framework for Projected Clustering of High Dimensional Data Streams," Proceedings of the 30th VLDB Conference, 2004, pp. 1-12.
Agrawal, R. et al., "Mining Association Rules Between Sets of Items in Large Databases," May 1993, pp. 1-10.
Apiletti, D. "Characterizing network traffic by means of the NetMine framework," Computer Networks, vol. 53, Issue 6, Apr. 23, 2009, pp. 774-789.
Auld, T. et al., "Bayesian neural networks for Internet traffic classification," IEEE Transactions on Neural Networks, vol. 18, No. 1, Jan. 2007, pp. 223-239.
Babcock, B. et. al., "Models and Issues in Data Stream Systems," 2002, pp. 1-30.
Baldi, M. et al., "Data Mining Techniques for Effective and Scalable Traffic Analysis," Ninth IFIP/IEEE International Symposium on Integrated Network Management, 2005, pp. 1-14.
Bernaille, L. et al., "Traffic classification on the fly," 2006, pp. 1-4.
Bifet, A. "Adaptive Learning and Mining for Data Streams and Frequent Patterns," SIGKDD Explorations, vol. 11, No. 1, pp. 55-56, Apr. 2009.
Brauckhoff, D. et. al., "Applying PCA for Traffic Anomaly Detection: Problems and Solutions," Proceedings of IEEE Infocom, Apr. 2009, pp. 2866-2870.
Casas, P. et al., "Unsupervised Network Intrusion Detection Systems: Detecting the Unknown without Knowledge," Computer Communications, vol. 35, Issue 7, 2012, pp. 1-12.
Casas, P. et. al., "Knowledge-Independent Traffic Monitoring: Unsupervised Detection of Network Attacks," 2012, pp. 1-7.
Casas, P. et. al., "On the use of Sub-Space Clustering & Evidence Accumulation for Traffic Analysis & Classification," 2011, pp. 1-6.
Das, A. et al., "Google news personalization: Scalable online collaborative filtering," WWW 2007 / Track: Industrial Practice and Experience, May 8-12, 2007, pp. 1-10.
Dean, J. et al., "MapReduce: Simplified data processing on large clusters," OSDI, 2004, pp. 1-13.
Dews, C. et al., "An analysis of Internet chat systems," IMC'03, Oct. 27-29, 2003, pp. 1-14.
Ene, A. et al., "Fast clustering using MapReduce," 2011, pp. 1-10.
Erman, J. et al., "Traffic classification using clustering algorithms," SIGCOMM'06 Workshops, Sep. 11-15, 2006, pp. 1-6.
Erman, J. et. al. "Semi-Supervised Network Traffic Classification," SIGMETRICS, Jun. 12-16, 2007, pp. 1-2.
Erman, J. et. al., "Offline/Realtime Traffic Classification Using Semi-Supervised Learning," Performance Evaluation journal, Oct. 2-5, 2007, pp. 1-16.
Eskin, E. et. al. "A Geometric Framework for Unsupervised Anomaly Detection: Detecting Intrusions in Unlabeled Data," 2002, pp. 1-20.
Ester, M. et al., "A Density-based Algorithm for Discovering Clusters in Large Spatial Databases with Noise," KDD-96 Proceedings, 1996, pp. 226-231.
Gaber, M. et. al. "On-board Mining of Data Streams in Sensor Networks," Advanced Methods for Knowledge Discovery from Complex Data, Springer, 2005, pp. 307-335.
Gaber, M. et. al., "Mining Data Streams: A Review," SIGMOD Record, vol. 34, No. 2, Jun. 2005, pp. 1-9.
Guan, Y. et al., "Y-Means: a clustering method for intrusion detection," Proceedings of Canadian Conference on Electrical and Computer Engineering, 2003, pp. 1083-1086.
Haffner, P. et al., "ACAS: Automated Construction of Application Signatures," SIGCOMM'05 MineNet Workshop, Aug. 22-26, 2005, pp. 1-6.
Han, J. et al., "Data Mining: Concepts and Techniques," Second Edition, The Morgan Kaufmann Series in Data Mangaement Systems, 2006, pp. 1-743.
Higginbotham, S. "Ericsson CEO Predicts 50 Billion Internet Connected Devices by 2020," GIGAOM, Apr. 14, 2010, pp. 1-7.
Hossain, M. et al., "Adaptive intrusion detection with data mining," IEEE International Conference on Systems, Man and Cybernetics 4, 2003, pp. 3097-3103.
Hyunchul, K. et al. "Internet traffic classification demystified: myths, caveats, and the best practices." Proceedings of the ACM CoNEXT, Dec. 10-12, 2008, pp. 1-12.
Jain, A. K. et. al., "Algorithms for Clustering Data," Prentice Hall Advanced Reference Series, 1988, pp. 1-334.
Karagiannis, T. et al., "BLINC: Multilevel Traffic Classification in the Dark," SIGCOMM'05, Aug. 21-26, 2005, pp. 1-12.
Karagiannis, T. et al., "Transport Layer Identication of P2P Traffic," IMC'04, Oct. 25-27, 2004, pp. 1-14.
Lakhina, A. et. al. "Diagnosing Network-Wide Traffic Anomalies," SIGCOMM, Aug. 30-Sep. 3, 2004, pp. 1-12.
Lakhina, A. et. al. "Mining Anomalies Using Traffic Feature Distributions," SIGCOMM, Aug. 21-26, 2005, pp. 1-12.
Le, F. et al., "Minerals: Using Data Mining to Detect Router Misconfigurations," CMU-CyLab-06-008, May 23, 2006, pp. 1-14.
Lee, W. et al., "Adaptive Intrusion Detection: a Data Mining Approach," Article Intelligence Review, May 2001, pp. 1-40.
Leung, K. et. al. "Unsupervised Anomaly Detection in Network Intrusion Detection Using Clusters," Conferences in Research and Practice in Information Technology, vol. 38, Jan. 2005, pp. 1-10.
Liu, Y. et al., "A Scalable Distributed Stream Mining System for Highway Traffic Data," PKDD 2006, LNAI 4213, 2006, pp. 309-321.
Liu, Y., "A Survey of Machine Learning Based Packet Classification," 2012, pp. 1-10.
Mazel, J. et. al., "Sub-Space Clustering, Inter-Clustering Results Association & Anomaly Correlation for Unsupervised Network Anomaly Detection," 2011, pp. 1-8.
Moore, A. W. et al., "Toward the Accurate Identification of Network Applications," PAM 2005, Mar. 31-Apr. 1, 2005, pp. 1-14.
Moore, A.W. et al., "Internet Traffic Classification Using Bayesian Analysis Techniques," SIGMETRICS '05, ACM Press, Jun. 6-10, 2005, pp. 1-11.
Muthukrishnan, S. "Data Streams: Algorithms and Applications," 2003, pp. 1-39.
O'Callaghan, L. et. al., "Streaming-Data Algorithms for High-Quality Clustering," Mar. 2002, pp. 1-10.
Ordonez, C. "Clustering Binary Data Streams with K-means," ACM SIGMOD Workshop on Research Issues in Data Mining and Knowledge Discovery, ACM, 2003, pp. 1-8.

* cited by examiner

800

Time Window

|  | $t_{i-n}$ | ... | $t_{i-3}$ | $t_{i-2}$ | $t_{i-1}$ | $t_i$ |
|---|---|---|---|---|---|---|
| $f_1$ | 0.45 | ... | 0.51 | 0.33 | 0.48 | 0.33 |
| $f_2$ | 0.21 | ... | 0.44 | 0.35 | 0.31 | 0.21 |
| $f_3$ | 0.68 | ... | 0.12 | 0.20 | 0.61 | 0.20 |
| . | . | . | . | . | . | . |
| . | . | . | . | . | . | . |
| . | . | . | . | . | . | . |
| $f_m$ | 0.12 | ... | 0.22 | 0.14 | 0.06 | 0.24 |

Features (rows); Time unit (column)

FIGURE 8

SYSTEM, METHOD, AND COMPUTER PROGRAM FOR DETECTING AND MEASURING CHANGES IN NETWORK BEHAVIOR OF COMMUNICATION NETWORKS UTILIZING REAL-TIME CLUSTERING ALGORITHMS

FIELD OF THE INVENTION

The present invention relates to communication networks and more particularly to real-time clustering algorithms to detect, classify, and measure changes in the network behavior associated with such communication networks.

BACKGROUND

Current DPI (Deep Packet Inspection) solutions classify network traffic according to rules obtained by analyzing historical network data. That implementation, known as signature-based or a supervised approach, has as a principal limitation of the incapacity to discover new traffic in the network and provide information about the unlabeled (unknown) traffic. State of the art DPI implementations can calculate the amount of "unclassified" traffic, however, such implementations are unable to provide information about how the unknown traffic looks and what the grade of similarity is with already labeled traffic.

There is thus a need for addressing these and/or other issues associated with the prior art.

SUMMARY

A system, method, and computer program product are provided for detecting and measuring changes in network behavior of communication networks utilizing real-time clustering algorithms. In use, network traffic associated with at least one communication network is received. Additionally, the network traffic is characterized and classified based on similarities in the network traffic utilizing one or more real-time clustering algorithms. Further, changes in network behavior of the at least one communication network are detected and measured utilizing information associated with the classified network traffic.

BRIEF DESCRIPTION OF THE DRAWINGS

FIG. 8 illustrates an example of a matrix, in accordance with one embodiment.

DETAILED DESCRIPTION

Figure 1:
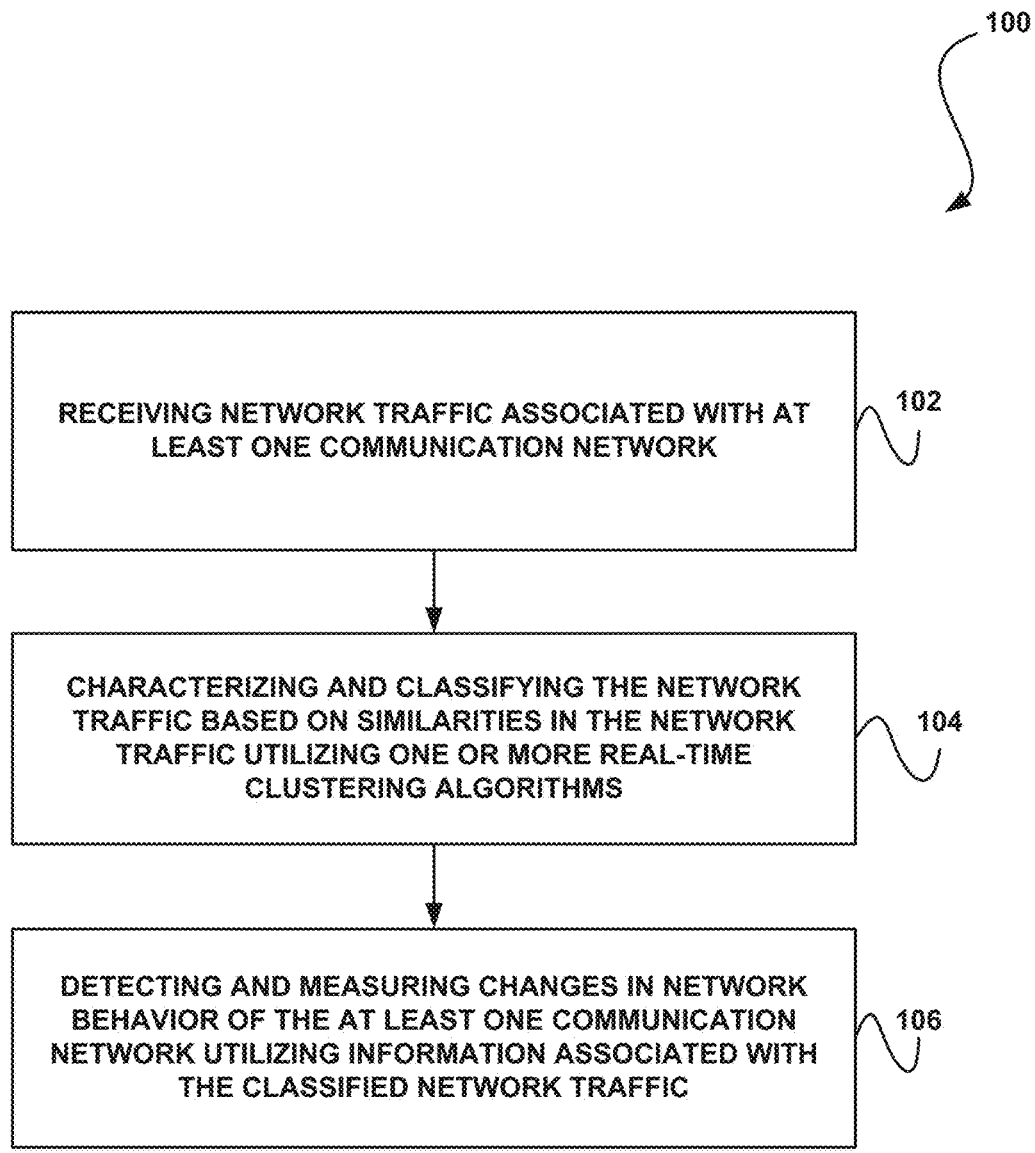
FIG. 1 illustrates a method for detecting and measuring changes in network behavior of communication networks utilizing real-time clustering algorithms, in accordance with one embodiment.

FIG. 1 illustrates a method 100 for detecting and measuring changes in network behavior of communication networks utilizing real-time clustering algorithms, in accordance with one embodiment.

As shown, network traffic associated with at least one communication network is received. See operation 102 The communication network may include any type of network such as a 2G network, a 3G network, a 4G network, a Wi-Fi network, or a WiMAX network, etc. The network traffic may include any traffic data associated with the communication network.

Additionally, the network traffic is characterized and classified based on similarities in the network traffic utilizing one or more real-time clustering algorithms. See operation 104.

Further, changes in network behavior of the at least one communication network are detected and measured utilizing information associated with the classified network traffic. See operation 106. In one embodiment, detecting changes in the network behavior of the communication network utilizing the classified network traffic may include detecting concept drift situations and distinguishing novelty from anomaly.

Characterizing and classifying the network traffic includes performing a variety of operations and/or steps. For example, in a first step, traffic is characterized in windows of time utilizing the real-time clustering algorithms and expressed in at least one algebraic expression (e. g. matrices). In a second step, network traffic is classified based on similarities among the algebraic expressions (e. g. matrices).

In another embodiment, classifying the network traffic may include calculating a similarity between past behavior of the communication network and present behavior of the communication network in real time. Additionally, in one embodiment, classifying the network traffic may include calculating a delta representing a distance between an expected behavior of the communication network and an observed behavior of the communication network.

Further, in one embodiment, classifying the network traffic may include calculating a degree of similarity of current network traffic and previously identified network traffic or traffic types. In another embodiment, classifying the network traffic may include executing a plurality of clustering processes in parallel, one clustering process per feature of the network traffic, to provide a level of dependency among variables included in the network traffic.

In one embodiment, classifying the network traffic based on similarities in the network traffic utilizing the real-time clustering algorithms may include creating clusters for each feature in the network traffic. In this case, each feature in the network traffic may include one of a categorical feature or a numerical feature. As examples, the categorical features may include IP source information, IP destination information, source port information, designation port information, protocol information, and flag information, etc. Numerical feature information may include, latencies, packets and bytes, etc.

Further, results of creating the clusters for each feature in the network traffic may be represented in a matrix. In this case, each row vector in the matrix may represent a cluster definition. Additionally, the matrix may include as many rows as clusters found in the network traffic.

In addition, a normalizing function may be applied to the matrix to generate a real number. Further, each feature may be clustered independently from each other feature resulting in a vector containing a norm of each matrix for each time unit. Still yet, a combination of time units may be selected to generate a plurality of periods and associated information that are stored in a time window matrix.

A similarity score may be calculated between each feature from a current time period and a previous time period. As an option, the similarity score may be used to profile the network traffic in real time and to determine how different current network traffic is compared to an expected behavior of the network traffic. As another option, the similarity score may be used to detect dangerous network traffic in early stages.

Still yet, in one embodiment, the method 100 may include generating a grade of accuracy of the classification of the network traffic.

Thus, the method 100 employs real-time clustering algorithms to detect changes in the network behavior and to classify the traffic according to its similarities as opposed to its signature. The ability to provide this real-time clustering and matching against previous known behaviors enables new patterns of behavior to be automatically identified and allows networks to be optimized more effectively. This real-time approach provides a critical improvement over current approaches that rely on models that are trained on historical data and are not reactive to new behavioral patterns.

In addition, the method 100 also provides a mechanism for producing a detailed description of the traffic behaviors in a network, allowing telecommunications companies to better understand the traffic flows in their network, which can be of tremendous value to these companies, enabling a number of potential use cases, for example to offer more creative pricing models, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
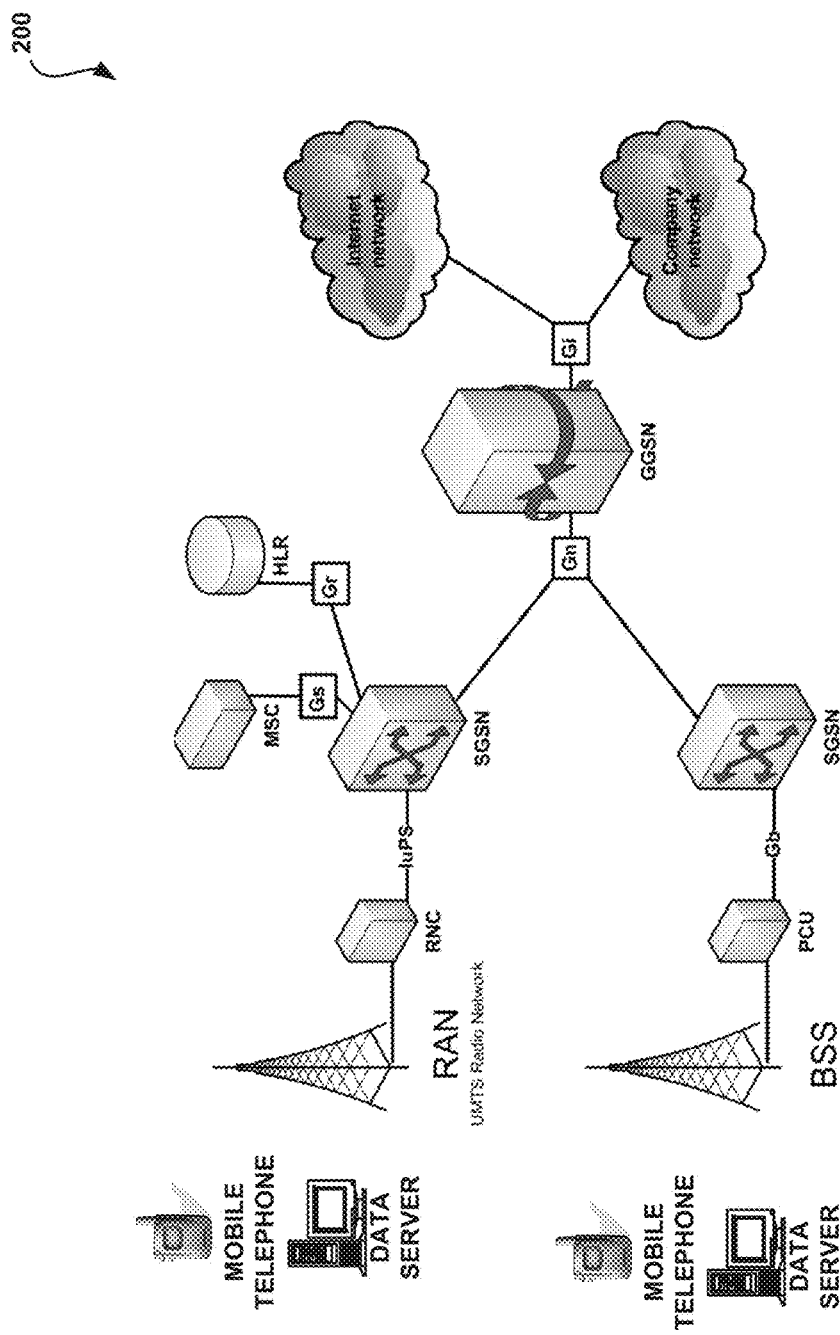
FIG. 2 illustrates a system for detecting and measuring changes in network behavior of communication networks utilizing real-time clustering algorithms, in accordance with one embodiment.

FIG. 2 illustrates a system 200 for detecting changes in network behavior of communication networks utilizing real-time clustering algorithms, in accordance with one embodiment. As an option, the system 200 may be implemented in the context of the details of FIG. 1. Of course, however, the system 200 may be implemented in the context of any desired environment. Further, the aforementioned definitions may equally apply to the description below.

In operation, network traffic associated with at least one communication network is received at a processing system. The network traffic is classified based on similarities in the network traffic utilizing one or more real-time clustering algorithms. Further, changes in network behavior of the communication network are detected utilizing information associated with the classified network traffic.

The migration of bandwidth-intensive and latency-sensitive applications, such as voice, gaming, traditional video, and HD video, to IP platforms will drive general data growth associated with communication service providers in the coming years. World-wide broadband penetration means more users will have access to these premium services and each user will demand more from service providers as they expect connectivity to be ubiquitous and services to be seamless, flexible, and delivered with satisfactory quality of experience.

The critical task of providing a quality user experience without merely throwing bandwidth at the problem is one of the most difficult tasks facing service providers. The first step toward making this decision is achieving an accurate view of what exactly is happening on the network.

Deep Packet Inspection (DPI) is a technology solution that can help provide network operators with this crucial information. DPI plays a central role in traffic shaping and determining user source and the type of application contained within a packet. However, combined with real-time analytics, DPI has the capability to handle critical value-added functions for wireline operators such as intelligent traffic management, enablement of Quality of Service (QoS), prevention of security attacks, real-time offer management based on transaction patterns, and optimization of network resources, etc.

The system 200 may utilize a procedure to use real-time clustering algorithms to detect changes in the network behavior and classify the network traffic according to its similarities.

With respect to network traffic and streaming, the data stream model assumes that input data is not available for random access from disk or memory, such as relations in standard relational databases, but rather that is arrives in the form of one or more continuous data streams. The stream model differs from the standard relational model in a variety of ways. For example, in the stream model the traffic or stream is considered as an unbounded sequence of T ($T_1$, $T_2$, $T_3$, $T_4$, $T_5$ . . . $T_n$). Further, the order in which elements of a stream arrive are not under the control of the system. In addition, data streams are potentially of unbounded size. Also, data stream elements that have been processed are either discarded or processed. Data stream elements that have been processed cannot be retrieved.

The first question in connection with the clustering of (active) data streams concerns the concept of distance or, alternatively, similarity between streams. Each stream generates a K number of clusters per window time. The stream itself does not fall into any cluster.

The qualitative, time-dependent evolution of a data stream is considered. That is to say, two streams are considered similar if their evolution over time shows similar characteristics. As an example, there may be two stock rates both of which continuously increased between 9:00 a.m. and 10:30 a.m. but then started to decrease until 11:30 a.m.

To capture this type of similarity, the Euclidean distance between the normalization of two streams may be derived.

Figure 3:
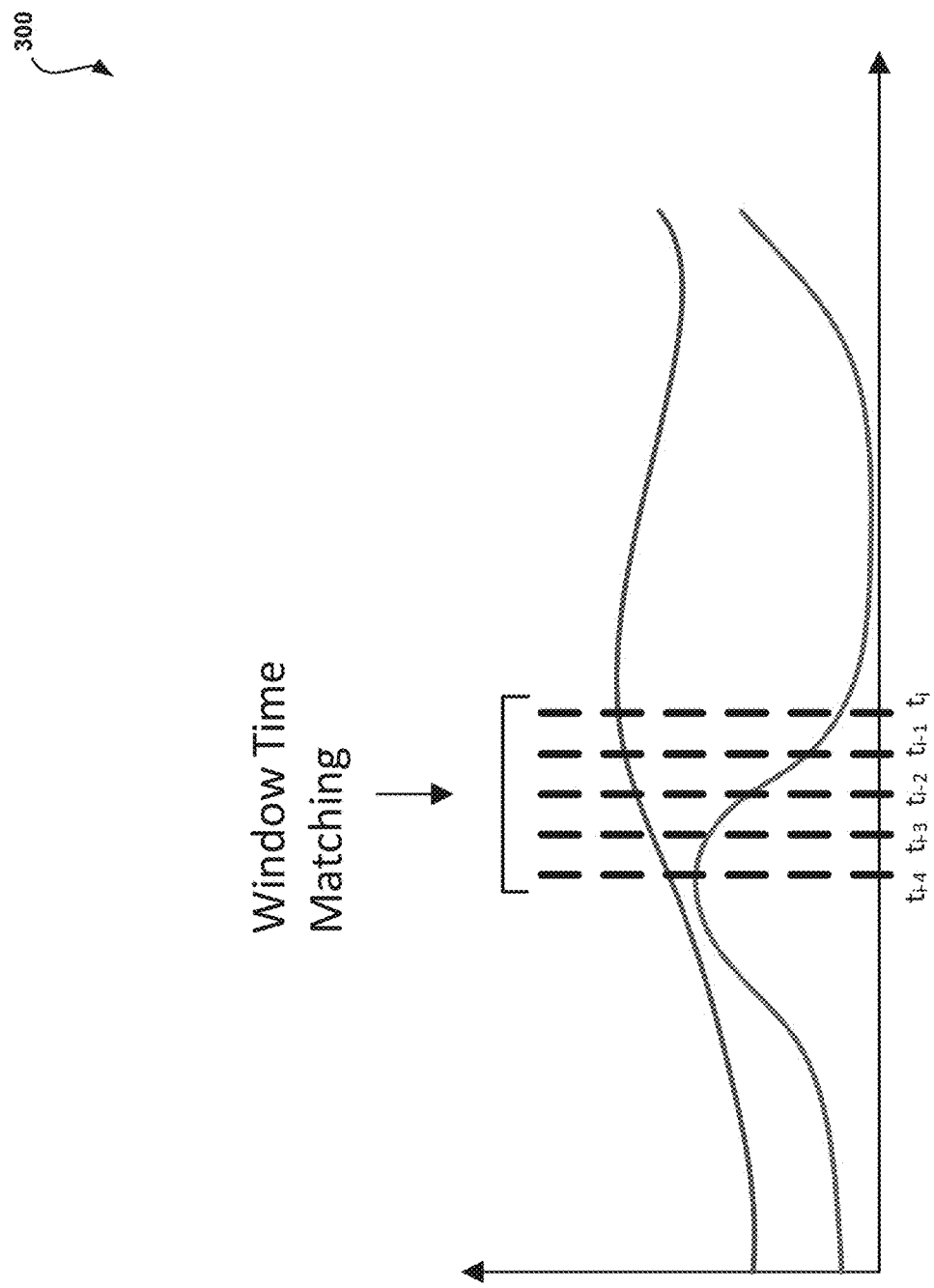
FIG. 3 illustrates an example of comparing 2 data streams evolving in a different way within a sliding window of a fixed size, in accordance with one embodiment.
Figure 4:
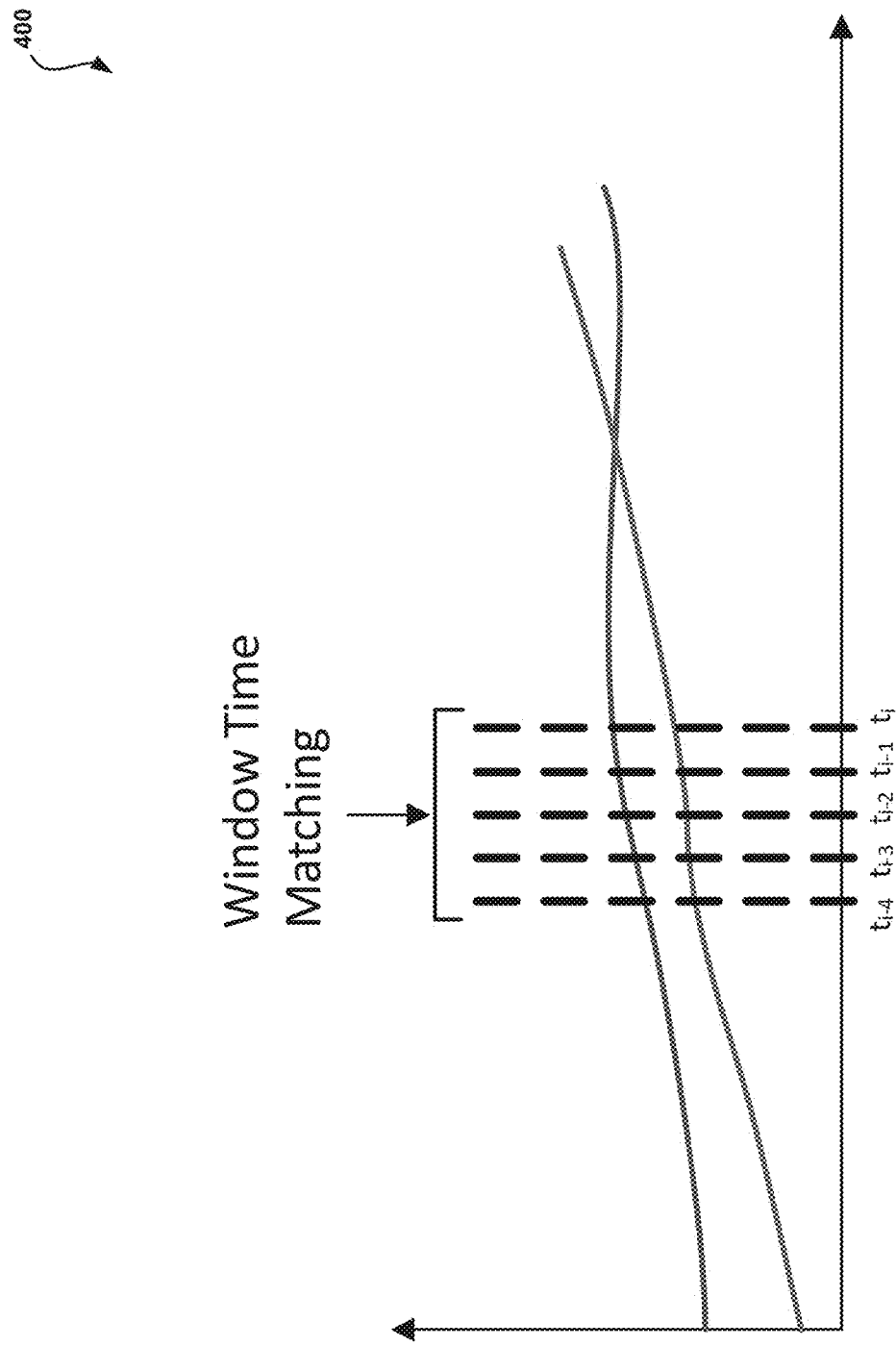
FIG. 4 illustrates another example of comparing 2 data streams evolving in a similar way within a sliding window of a fixed size, in accordance with one embodiment.

Data streams are compared within a sliding window of fixed size. FIG. 3 illustrates an example 300 of comparing data streams within a sliding window of fixed size, in accordance with one embodiment. FIG. 4 illustrates another example 400 of comparing data streams within a sliding window of fixed size, in accordance with one embodiment.

In the example of FIG. 3, the behavior of the two streams is obviously quite different. While in the example of FIG. 4, the two streams are similar to some extent.

These examples already suggest that one will usually not be interested in the entire data streams, which are potentially of unbounded length. Instead, it is reasonable to assume that more recent observations are more important than further in the past. Therefore, one often concentrates on a time window, which is a subsequence of a complete data stream. The most common type of window is a so-called sliding window that is of fixed length and comprises the most recent observations. A more general approach to taking the relevancy of observations into account is that of weighting. Here, the idea is to associate a weight in the form of a real number to each observation such that more recent observations receive higher weights.

When considering data streams in a sliding window of length 'w', a stream can formally be written as a w-dimensional vector $X=(x_0, x_1, \ldots x_{w-1})$, where a single Observation $x_i$ is a matrix of real numbers.

Data streams will then be analyzed and clustered in a "block-wise" manner each time the time between times unit (T) is elapsed. This approach gains efficiency since the number of necessary updates is reduced by a factor of T. On the other hand, the fact that the clustering structure is not always up-to-date has to be tolerated.

The goal of online clustering is to divide flows into natural groups. The instances contained in a cluster are considered to be similar to one another according to some metric based on the underlying domain from which the instances are drawn.

Given a set of observations $(x_1, x_2, \ldots, x_n)$, where each observation is a d-dimensional (1-dimension in accordance with one embodiment) real vector, k-means clustering aims to partition the n observations into k ($\leq$n) sets $\{S=S_1, S_2, \ldots S_k\}$ so as to minimize the within-cluster sum of squares (WCSS). In other words, its objective is to find:

$$\operatorname*{argmin}_{s} \sum_{i=1}^{k} \sum_{x_j \in S_i} \|x_j - \mu_i\|^2$$

where $\mu_i$ is the mean of points in $S_i$.

The most common algorithm uses an iterative refinement technique. Due to its ubiquity it is often called the k-means algorithm; it is also referred to as Lloyd's algorithm. Given an initial set of k means $m_1^{(1)}, \ldots, m_k^{(1)}$ (see below), the algorithm proceeds by alternating between two steps: an assignment step and an update step.

In the assignment step, each observation is assigned to the cluster whose mean yields the least within-cluster sum of squares (WCSS). Since the sum of squares is the squared Euclidean distance, this is intuitively the "nearest" mean. Mathematically, this means partitioning the observations according to the Voroni diagram generated by the means. For example: $S_i^{(t)}=\{x_p: \|x_p-m_i^{(t)}\|^2 \leq \|x_p-m_j^{(t)}\|^2 \forall j, 1\leq j \leq k\}$, where each $x_p$ is assigned to exactly one $S^{(t)}$, even if it could be is assigned to two or more of them.

In the update step, the new means is calculated to be the centroids of the observations in the new clusters, as described by:

$$m_i^{(t+1)} = \frac{1}{|S_i^{(t)}|} \sum_{x_j \in S_i^{(t)}} x_j.$$

Since the arithmetic mean is a least-squares estimator, this also minimizes the within-cluster sum of squares (WCSS) objective.

The algorithm has converged when the assignments no longer change. Since both steps optimize the WCSS objective, and there only exists a finite number of such partitioning, the algorithm must converge to a (local) optimum. There is no guarantee that the global optimum is found using this algorithm.

The algorithm is often presented as assigning objects to the nearest cluster by distance. The standard algorithm aims at minimizing the WCSS Objective, and thus assigns by "least sum of squares", which is exactly equivalent to assigning by the smallest Euclidean distance. Using a different distance function other than (squared) Euclidean distance may stop the algorithm from converging. Various modifications of k-means such as spherical k-means and k-medoids may be considered to allow using other distance measures.

The system 200 may use online clustering techniques to create clusters for each feature (categorical or numerical) in the traffic. For instance, if the techniques described herein were implemented in a Cisco (g) workflow interface, the following interface may be present: IP Source (Categorical); IP Destination (Categorical); Source Port (Categorical); Destination port (Categorical); Protocol (Categorical); Flags (Categorical); Packets (Numerical); and Bytes (Numerical).

Figure 5:
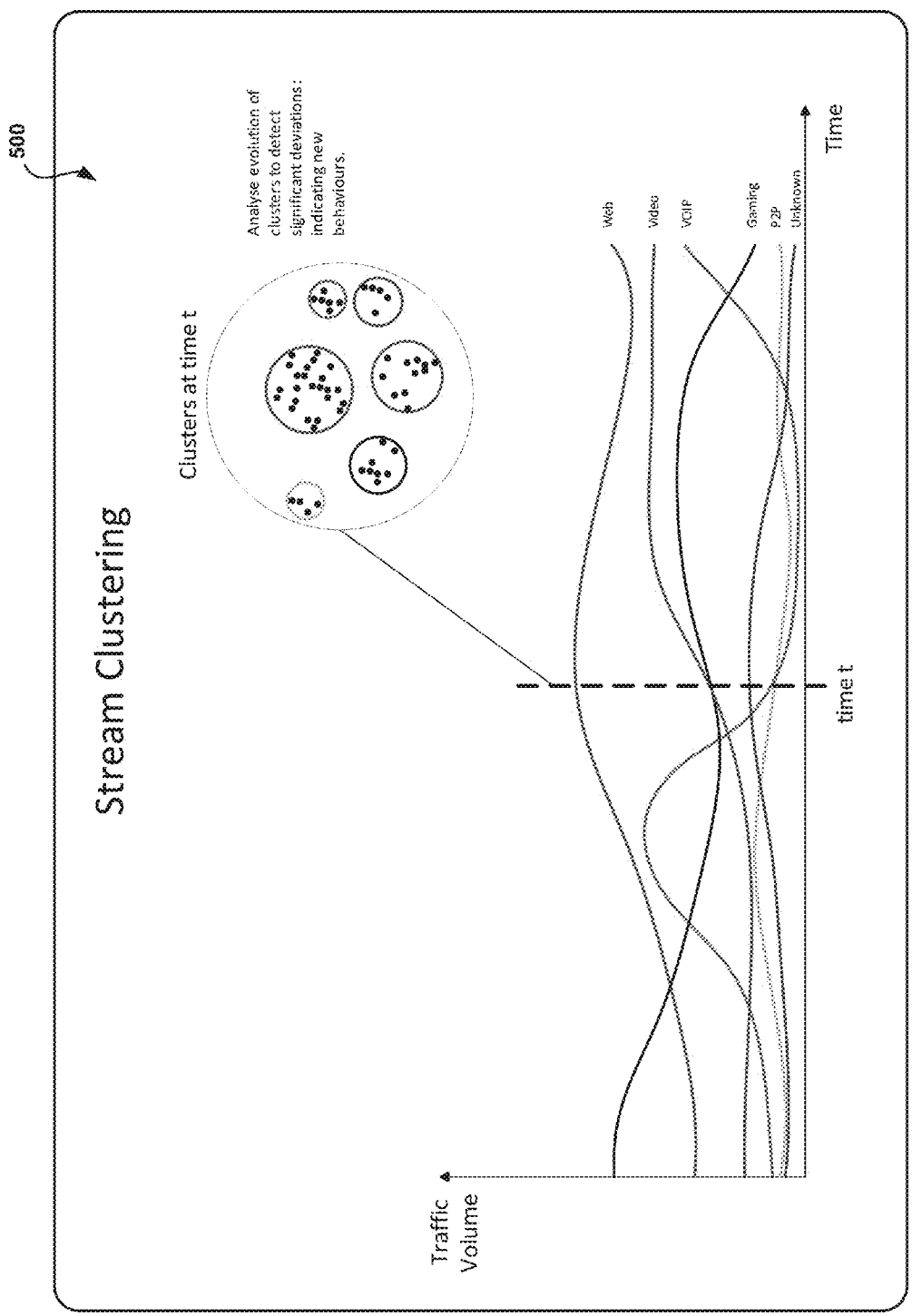
FIG. 5 illustrates an example of stream clustering, in accordance with one embodiment.

FIG. 5 illustrates an example 500 of stream clustering, displaying the clustering achieved at time t, in accordance with one embodiment. Each clustering process (at a given time t) generates a set of measures that represent the data distribution.

Such clustering calculation may include determining various information, such as: a number of clusters (determine the number of clusters found in the sample); global distance (defines the distance of each cluster's centroid to a single global centroid); density (defines the density for each cluster [(Sample length−outliers)/π*radio$^2$]; radio (defines the radio for each cluster, computed as the average of the distances of each point to the cluster's centroid+the standard deviation); sample length (defines the total number of samples belonging to the cluster); and outliers (defines the number of samples that belong to the cluster located beyond the cluster boundaries).

These results are represented in a matrix, where each row vector represents the cluster definition and there are as many rows as clusters found in the sample. For instance, Table 1 shows the outcome of the algorithm which detects four clusters.

TABLE 1

| Cluster | Global distance | Density | Radio | Sample length | Outliers |
|---|---|---|---|---|---|
| 1 | 3 | 23.5 | 44.5 | 458 | 23 |
| 2 | 2.8 | 105 | 62.8 | 2138 | 198 |
| 3 | 7 | 4 | 39.3 | 10 | 2 |
| 4 | 4 | 53.7 | 109.6 | 320 | 43 |

Figure 6:
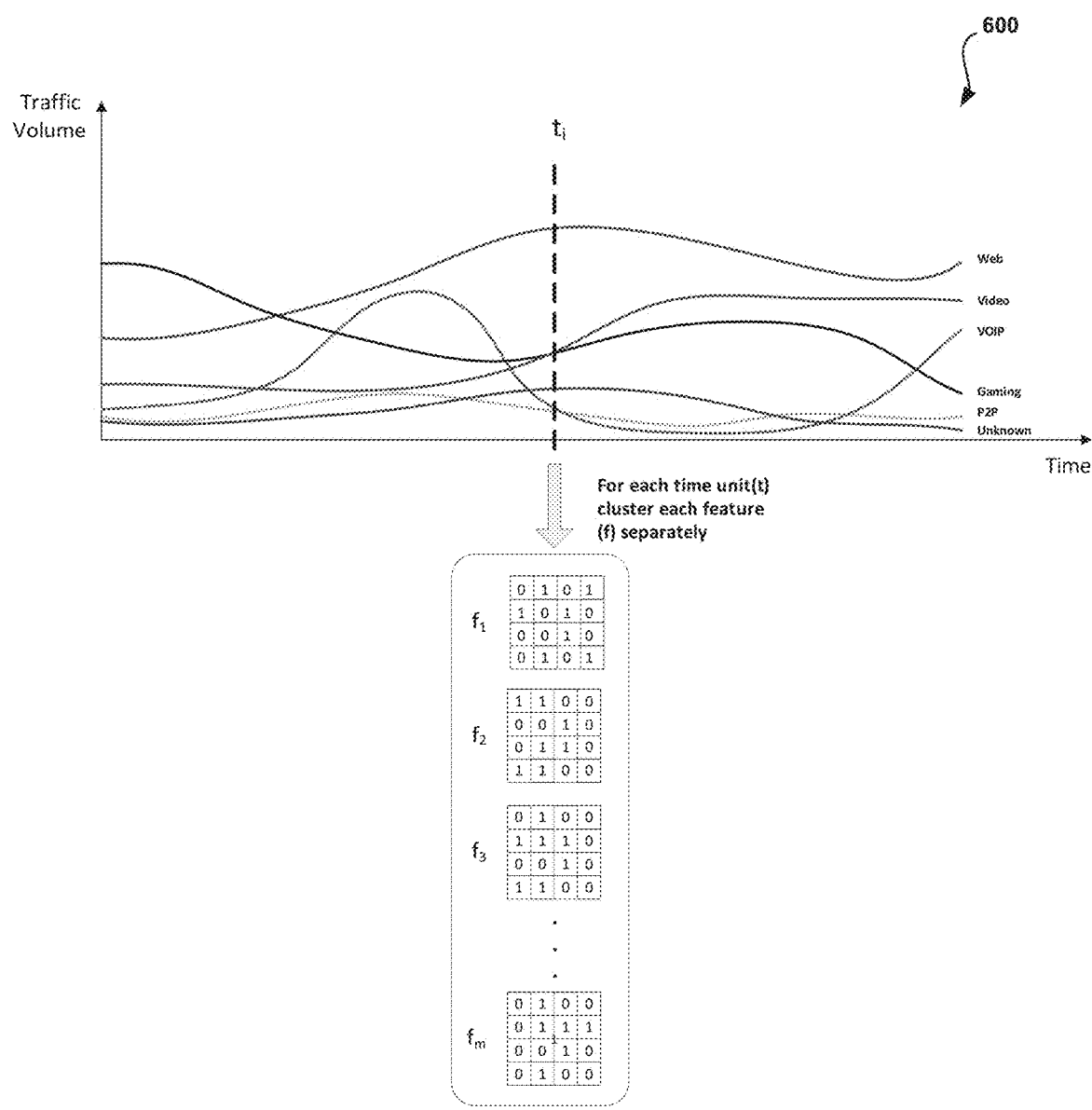
FIG. 6 illustrates an example showing a result of the clustering process, in accordance with one embodiment.

FIG. 6 illustrates an example 600 showing a result of the clustering process, in accordance with one embodiment.

Applying the Frobenius or Euclidean norm to the resulting matrix yields a real number. For example, applying the Frobenius Norm formal definition, $$\|A\|_F := \left( \sum_{i=1}^{m} \sum_{j=1}^{n} |a_{ij}|^2 \right)^{1/2}$$

yields 2226.8663.

Figure 7:
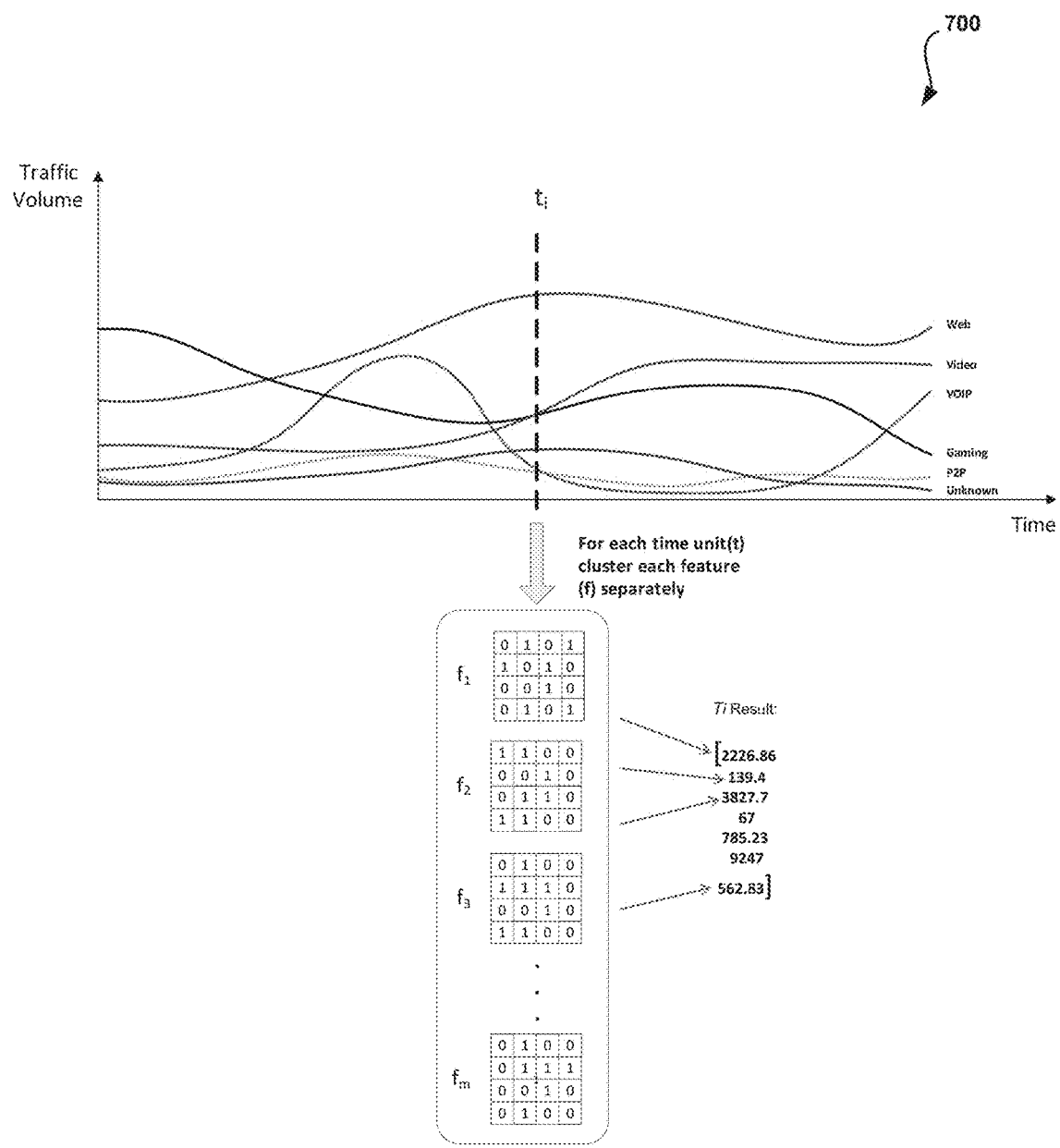
FIG. 7 illustrates an example of applying the Frobenius Norm to a matrix resulting from the clustering process, in accordance with one embodiment.

FIG. 7 illustrates an example 700 of applying the Frobenius Norm to a matrix resulting from the clustering process, in accordance with one embodiment.

In this case, the time elapsed between each clustering result is referred to as "time unit" and represented by T. Each feature is clustered independently from each other and as a consequence the result for each time unit will be a vector containing the Frobenius norm of each matrix.

A combination of M number of T's are real-red as window time. This information is stored in a matrix database. FIG. 8 illustrates an example 800 of a matrix database, in accordance with one embodiment.

Figure 9:
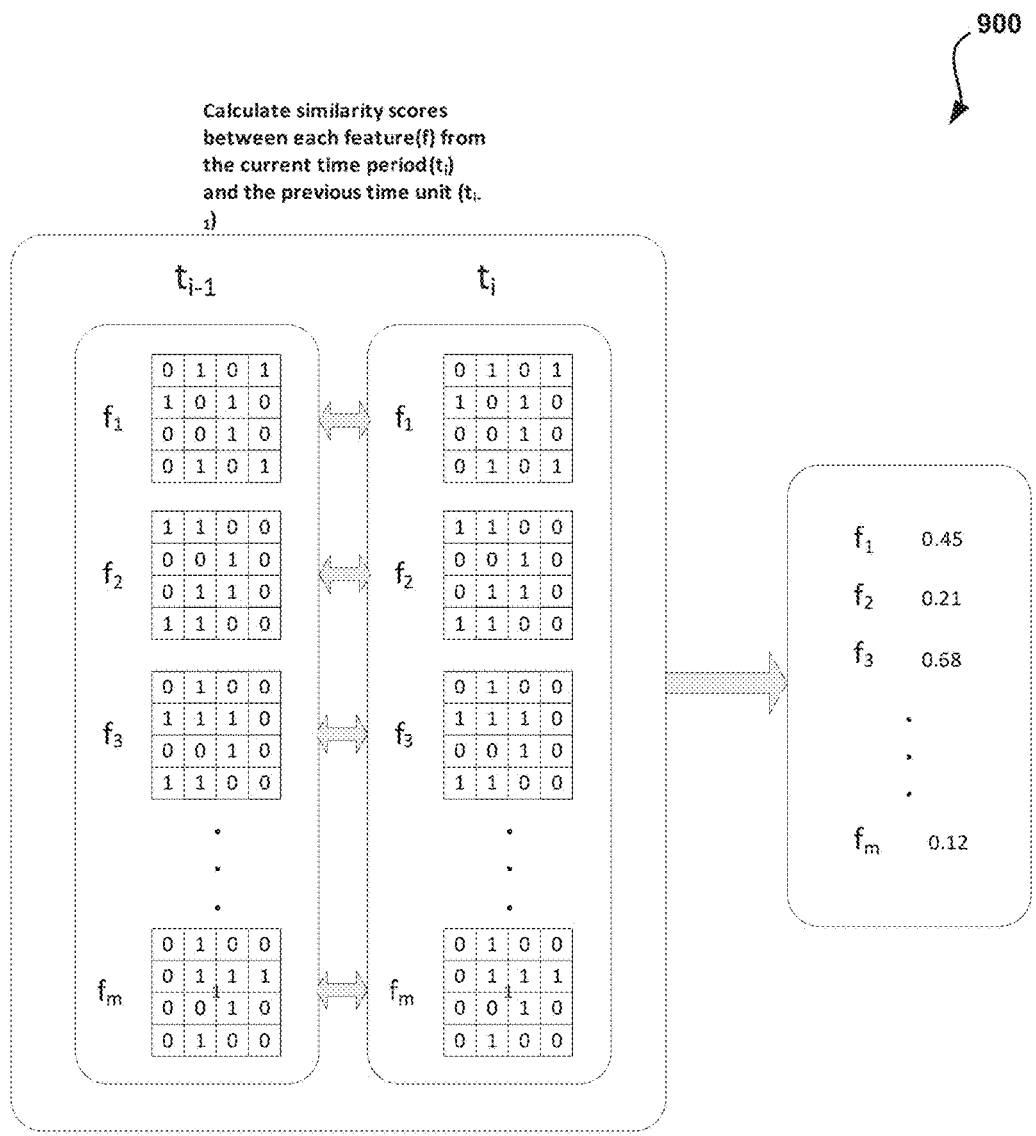
FIG. 9 illustrates an example of a similarity score calculation, in accordance with one embodiment.

From each time period, a similarity score can then be calculated (for each feature) from the current time period ($t_i$) and the previous time period ($t_{i-1}$). FIG. 9 illustrates an example 900 of a similarity score calculation, in accordance with one embodiment.

The system 200 exposes metrics expressed in a matrix format than can be used to both profile the traffic in real time and determine how different the current traffic is with respect to the expected behavior, as well as potentially detecting malicious or dangerous traffic in early stages.

As a general comparison method, for a given matrix A, representing a window time (or a set of windows time), where each column vector represents the vector definition for each $t_i$ (e.g. see FIG. 8), the distances between vectors are computed and a temporal sequence of scalar values is obtained (e.g. as in FIG. 9).

This sequence that captures the evolution of traffic can then matched against similar historical sequences to calculate how far the current traffic evolution is to previous labeled sequences.

With regards to the behavior distance calculations, questions arise as to how to calculate a measure of distance between the current traffic and what would be considered to be normal traffic at that specific point in time, and how different the traffic behavior is now compared to, for example, five minutes ago.

Answers to these questions enable the user to detect in real time whether something potentially dangerous is happening in the network. Applying the previous discussed method, the first question is addressed by the comparison of a labeled and stored matrix with the data coming from the clustering process (e.g. employed by a clustering engine, etc.).

Figure 10:
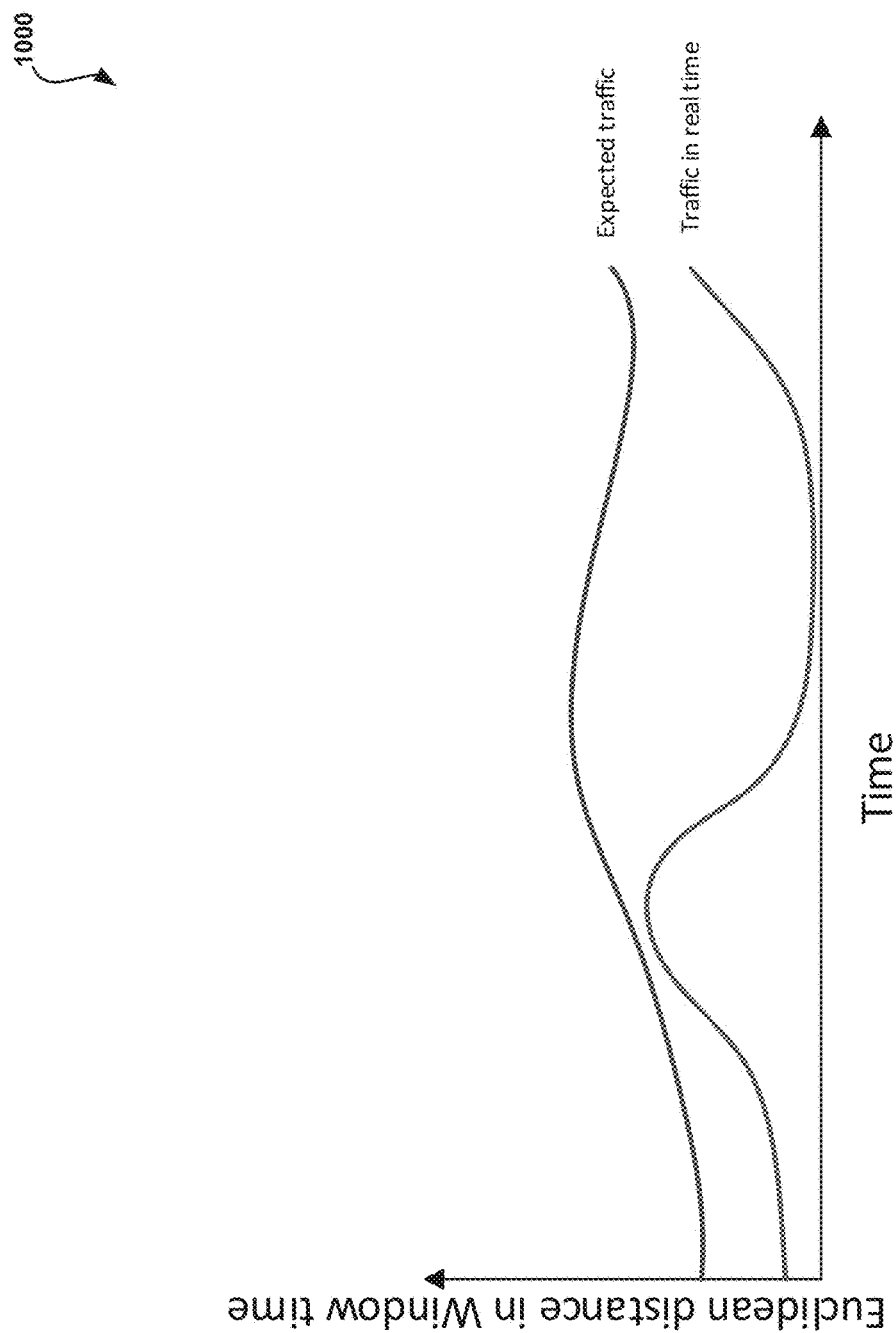
FIGS. 10 and 11 show examples of network profiles, in accordance with various embodiments.
Figure 11:
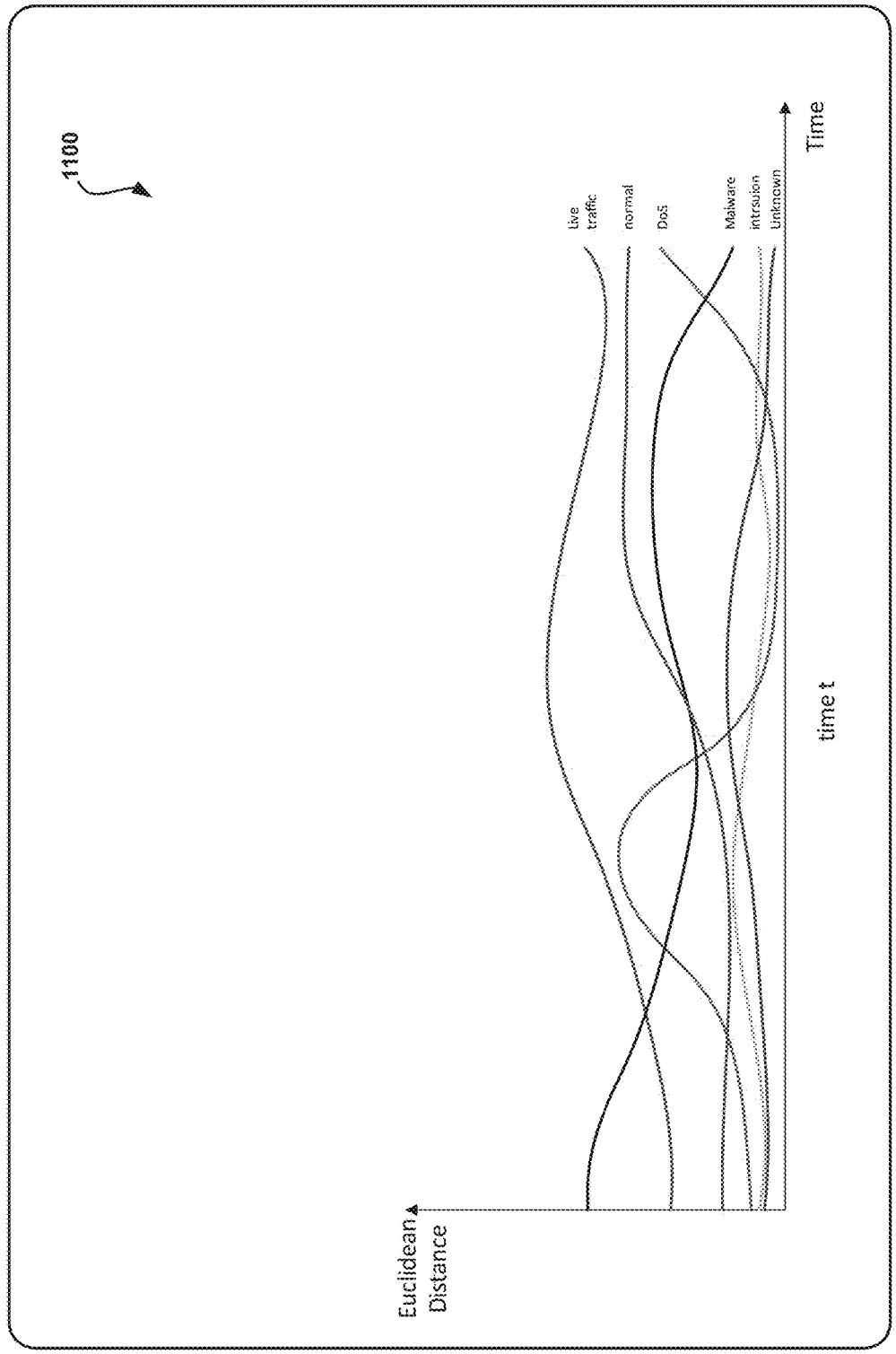

Before offering a distance to the normality and calculating the degree of normality, normal traffic needs to be defined. As many network profiles as needed may be defined, more than just a "normal" definition, such as attack, intrusion, DoS or any other dangerous situation can describe a different profile and the degree of similarity between the current traffic and these profiles may be calculated in real-time, as shown in FIGS. 10 and 11. FIGS. 10 and 11 show examples of network profiles 1000 and 1100, in accordance with various embodiments.

For example, in relation to virus immunity, once a system knows how each virus behaves, the system is able to learn it and detect it in the future.

In regards to how different the traffic behavior is compared to previous behavior, the sequence matching process does not take place between labeled and current traffic. The comparison is carried out with the recently stored data (not necessarily labeled).

Note that the distance between vectors is used to get the distance between behaviors, however, each vector contains all the values for each feature at each Such information can be used to study the feature evolution individually or in a subset of features.

Thus, the system 200 may be operable to cluster a real-time stream of data, which provides a description of the traffic in the network at that time. Using this, the system 200 can observe the evolution of behavior in the network and match this against known patterns, which provides a mechanism for detecting new behavioral patterns (as well as potentially malicious behaviors) in the network (e.g. utilizing similarity scores against previous patterns, etc.). Moreover, the system 200 may implement techniques to overcome various issues associated with solutions tried in the past.

For example, the observation of network traffic is at the core of many fundamental network operation and maintenance activities, such as the enforcement of quality of service guarantees or traffic engineering, and of security issues such as intrusion detection and prevention or the appearance of new patterns due to the constant inclusion of new applications and services.

However, the rapid introduction of new categories of applications such as mobile apps and peer-to-peer communication, the increasing presence of malicious traffic, and the widespread use of encryption techniques, make the measurement, analysis and classification of Internet traffic a challenging task. This practical need has motivated an extensive development of the automatic network traffic classification field.

The classical approach to online network traffic characterization relies on mapping user applications to well-known ports. Nevertheless, to avoid detection, P2P applications began to using dynamic port numbers and port numbers used by commonly used protocols such as HTTP or FTP. Many recent researchers concluded that port-based identification of network traffic is ineffective. To try to solve port-based classification drawbacks, several payload analysis techniques have been proposed. In the techniques proposed, packet payloads are inspected to determine whether they contain characteristic signatures of known applications. While this approach is more accurate, it is resource-intensive, expensive, scales poorly to high bandwidths (Le, it requires increasing processing and storage capacity, since a growing number of signatures must be identified), does not work on encrypted traffic, and causes tremendous privacy and legal concerns.

The limitations of port-based and payload-based analysis have motivated the use of transport layer statistics for traffic classification. These classification techniques rely on the fact that different applications typically have distinct behavior patterns when communicating on a network. Transport layer statistics such as the total number of packets sent, the ratio of the bytes sent in each direction, the duration of the connection, inter-packet arrival times, and the average size of the packets, characterize these behaviors. Therefore, during the last mid-decade, the research community has devoted a great effort to the study of new traffic characterization and classification mechanisms, with the specific intent of surpassing the limitations that these traditional approaches based on port and payload analysis face.

During the last decade, a significant effort has been devoted to the application of machine learning and data mining techniques to network traffic analysis. The application domains include studying correlations among data (e.g., association rule extraction for network traffic characterization or for router misconfiguration detection), extracting information for prediction (e.g., multilevel traffic classification, Naive Bayes classification and Bayesian neural networks), grouping network data with similar properties, and context specific applications (e.g., multi-level association rules in spatial databases). In the context of traffic characterization, both unsupervised and supervised classification techniques have been exploited.

Supervised machine learning (e.g. Naive Bayes classification and Bayesian neural networks) requires previous knowledge of the application domain (i.e., training data to be labeled in advance), and produces a model that fits the training data. The advantage of these algorithms is that they can be tuned to detect subtle differences and they clearly label the flows upon termination, unlike the unsupervised techniques. Unfortunately, class imbalance and concept drift problems challenge techniques utilized by these algorithms. Class imbalance is generated because traffic classifiers tend to be biased towards the application that generates far more traffic flows than the other applications. Concept drift is produced when underlying data distribution changes with time, since the Internet data stream dynamically in large volumes. Therefore, supervised techniques currently available are not adequate to emerge new patterns in network flows or to catch traffic patterns evolution.

Unsupervised learning techniques (e.g. clustering algorithms or association rules extraction) essentially groups flows with similar characteristics together. The advantage is that they do not require training nor previous knowledge of the application domain. Hence, they are exploratory techniques that may be exploited to highlight hidden knowledge in network flows and to catch traffic patterns evolution. Among unsupervised techniques, cluster analysis is one of the methods for identifying classes amongst a group of objects, and may be used as a tool in many fields such as biology, finance, and computer science. Cluster analysis has the ability to group Internet traffic using only transport layer characteristics. Several statistics may be collected (e.g., packet length, inter-arrival time, connection duration) for each flow. Flows characterized by similar statistics may be grouped together by means of the EM clustering algorithm. Thus, according to the clustering structure, different types of traffic data may be identified (e.g., HTTP, FTP, SMTP).

Additionally, the EM algorithm may be exploited to identify the best cluster set from the training data. Given the clustering result, a Bayesian classifier may be exploited to classify new incoming data. Further the K-Means algorithm may be exploited to group together flows that belong to the same application level protocol.

Association rule extraction is another unsupervised technique that may be utilized. However, to discover potentially relevant knowledge, a very low support constraint has to be enforced, hence generating a huge number of unmanageable rules.

Over the last years some versions of typical clustering algorithms using map-reduce paradigm have been proposed to exploit the high degree of parallelization that can be achieved with a big data approach. However, all these proposals lack from a clean slate approach, where map primitives are used only to do some initial filter/sampling process, and then, reduce primitives encapsulate typical centralized versions of clustering algorithms.

Recently, the data generation rates in data sources become faster than ever before. This rapid generation of continuous streams of information has challenged storage, computation and communication capabilities in computing systems. Data stream mining systems, models and techniques have been proposed and developed over the past few years to address these challenges, and several data-based and task-based techniques have been developed to cope with these challenges. Principal data based techniques are sampling, load shedding, sketching, synopsis data structures and aggregation. Moreover, approximation algorithms, sliding windows and algorithm output granularity are representatives of task-based techniques. An incremental k-means algorithm for clustering binary data streams may in some cases outperform the scalable k-means.

STREAM and LOCALSEARCH algorithms may also be used for high quality data stream clustering. One framework (called CluStream) divides the clustering process into an online component that stores summarized statistics about the data streams, and an offline process that performs clustering on the summarized data according to a number of user preferences such as the time frame and the number of clusters. HPStream is a projected clustering for high dimensional data streams that has outperformed CluStream in recent results. Lightweight Clustering (LWC) is an algorithm that adjusts a threshold that represents the minimum distance measure between data items in different clusters. This adjustment is done regularly according to a pre-specified time frame, according to the available resources, by monitoring the input-output rate.

Additionally, a framework for developing algorithms that can adaptively learn from data streams that change overtime (i.e. evolving data streams) may be implemented. These methods are based on using change detectors and estimator modules at the right places. It presents an adaptive sliding window algorithm ADWIN for detecting change and keeping updated statistics from a data stream, and use it as a black box in place or counters or accumulators in algorithms initially not designed for drifting data. Nevertheless, none of the latter general-purpose techniques show a clear answer to scalability with respect to an exponential growth of data sources.

In the context of network traffic characterization, and due to the continuous growth in network speed, terabytes of data may be transferred through the core network of a typical ISP every day. Moreover, in a middle term M2M/IoT scenario, some telecom companies have predicted an exponential growth of more than 50 billion connected devices generating huge amounts of network traffic in 2020. Thus, two major issues hamper network data capture and analysis in the short and middle term: (a) a huge amount of data coming from a huge number of sources can be collected in a very short time, and (b) it is hard to identify correlations and detect anomalies in real-time on such large network traffic traces.

In this context, a recent work called NETMINE has been proposed to perform on-line stream analysis to aggregate and filter network traffic, refinement analysis to discover relationships among captured data, and rule classification into different semantic groups. However, scalability is managed mainly by a first-stage data stream processor performing the on-line stream analysis, and then, if this processor lacks scalability, the whole system scalability is compromised. Besides, online traffic characterization is implemented with a typical offline association rule engine working with a sliding window of 60 seconds. Moreover, NETMINE response in this context is shown with a unique experiment processing a small input flow of 100 Mbps. Therefore, NETMINE lacks true scalability and adaptability to catch in real time traffic pattern evolution.

In the context of unsupervised network detection intrusion schemes, the vast majority of the proposed research works are based on clustering and outliers detection. In some cases, a single-linkage hierarchical clustering method may be utilized to cluster data from the KDD99 dataset, based on the standard Euclidean distance for inter-patterns similarity.

Moreover, traffic patterns are evolving continuously and supervised systems must be retrained continuously to try to catch traffic patterns evolutions. In this scenario, unsupervised techniques outperform supervised techniques. Therefore, semi-supervised approaches may catch the best of both worlds. First, fast and accurate classifiers can be obtained by training with a small number of labeled mixed with a large number of unlabeled flows. Second, it can be handled both previously unseen applications and changed behavior of existing applications. Furthermore, iterative development of the classifier can be made by allowing network operators the flexibility of adding unlabeled flows to enhance the classifier's performance. Recently, several semi-supervised approaches have been proposed in the field of traffic characterization. Nevertheless, these semi-supervised mechanisms rely on state of the art clustering techniques, and hence, they also lack scalability when faced to an exponential growth of flows.

Finally, from a commercial perspective, when it comes to real-time data management or more properly said online data management, recently there has been a lot of talk about Complex Event Processing (CEP) and the benefits that it can bring to the industry. CEP is the analysis of event data in real-time to generate immediate insight and enable instant response to changing conditions. Likewise, a seemingly similar concept is that of Business Rules engine. These again work in enterprises and help in triggering actions on the basis of the set of rules defined. But the question emerges regarding how the CEP is different from a Rules Engine. One main difference is that REs are stateless. An input payload is expected fir an RE, which is processed and output is produced. CEP engines are stateful and can be persisted and in case of failure, recovery is supported as opposed to rules engines. Another difference is that REs expect a single payload of data, whereas CEPs can accept data and output data to multiple channels. CEPs works on real-time event data, which is coming into the system, where REs would be working on stored data or payload data (now some RE's support pseudo real-time event data too). Hence, REs should be used where the situation does not need to be stateful and there is no need for either real-time events or time based event correlation. CEP's and Business Rules can work together and complement each other.

There is a need to improve the scalability of the existent techniques and their performance in massively parallel computing environments, and to design and develop advanced algorithms (e.g., association rule mining or clustering) with horizontally scalable approaches, such as those based on Map Reduce and sharded columnar storage backends. Some unsupervised and supervised learning algorithms are already available as large-scale distributed techniques (e.g., in the Hadoop-based Apache Mahout machine learning library), but their early-stage development gives much room for research and improvement, also considering different distributed environments with respect to the currently dominant Map Reduce paradigm. Complex algorithms, such as association rule extraction, are currently missing from any open and freely available implementation.

Parallel extraction is provided by Apache Mahout but it is limited to a subset of the frequent item-sets, which represent only an intermediate step of the full association rule analysis. Also, research on the subject is still in an early stage, thus giving much room to advance such a powerful tool of analysis. Furthermore, large-scale mining algorithms are much less rich of features with respect to the vast amount of algorithms that can be applied to small-scale datasets on a single machine. Current supervised and unsupervised mechanisms, with the exception of clustering data stream versions, do not catch traffic patterns evolution in real time. Moreover, current clustering data stream algorithms lack elastic scalability.

Elastic scalability should provide the possibility for more resources (CPU, processes) to be assigned dynamically if they were needed during the execution. Later, when these resources were no longer necessary, the system would release them. This would be the case, for example, if a pool of parallel CluStream instances were executing at each moment. At the beginning, only five CluStream instances would be executing, but 5 seconds later ten more CluStream instances would be executed to observe growing flows. Later, when input flows decreased, the number of CluStream instances would be reduced to five again. There is no map-reduce version with the exception of a trivial one based on clustering algorithms.

When facing a data scenario, clustering algorithms must be adapted to this new paradigm so they can scale as much as possible (e.g. up to the hardware/software limits of the underlying Hadoop platform). Besides, data stream versions of clustering algorithms should be designed from scratch trying to exploit map-reduce infrastructures (or at least a flexible/elastic model for parallelize should be devised).

Finally, experimental results do not use big traffic datasets. They never store datasets with a big data approach. In general, available commercial solutions claim they allow you to determine exactly what is going on in the network, but they do not provide the details of what kind of techniques they apply to extract knowledge from the network traffic flows. Besides, none of them claim to detect new traffic patterns, or traffic patterns evolution in real time. In addition, no detail is offered on how they plan to manage an exponential growth of flows and data.

Accordingly, the techniques described herein overcome these and various other issues by: facilitating the usage of online machine learning techniques to model the live traffic of a communications networks in numerical matrices; facilitating the usage of online machine learning techniques to encapsulate the traffic in windows time and express it in algebraic expressions; facilitating the usage of online machine learning techniques to calculate in real time the similarity between behaviors; providing any time, all the time, a delta expressing the distance between the expected behavior and the observed behavior of a network; providing any time, all the time, a degree of similarity of current traffic to all the previous identified traffic types; allowing for individual clustering processes running in parallel, one per feature, qualifying a system to provide any time, all the time, the level of dependency among the variables composing the traffic flow; offering the capability to provide any time all the time the grade of accuracy of classifier engine; and offering the capability to detect concept drift situations and distinguish novelty from anomaly.

One of the generic avenues for extracting value is the identification of actionable insights from data. The techniques described herein provide a solid, well framed methodology for the extraction of actionable insights from sequential events. This is achieved via the identification of patterns which are generated by a common root cause, while being separable from standard or expected processes. This is a high value proposition as these patterns can be extremely difficult to detect, yet can be a cause of serious process issues in many organizations. Such issues can lead to reduced customer experience, reduced customer satisfaction, extra costs overhead, unnecessary churn, etc.

One of the main reasons this has such high value is that so many issues (and opportunities) experienced by a company's customers can be found in processes. Events from these processes are often stored in large databases and there are no common or standard tools for analyzing them, or for extracting the kind of significant pattern.

In addition to this, Deep Packet Inspection systems have the capability to exchange information with a carrier's billing system. This provides the ability for the carrier to offer more flexible, as well as fully personalized plans for their customers, as well as the ability to provide metered pricing. In this way, customers could be charged based on their usage, rather than a flat rate.

The techniques described herein also allow telecommunications companies to better understand the traffic flow in their networks and to better manage those networks.

Figure 12:
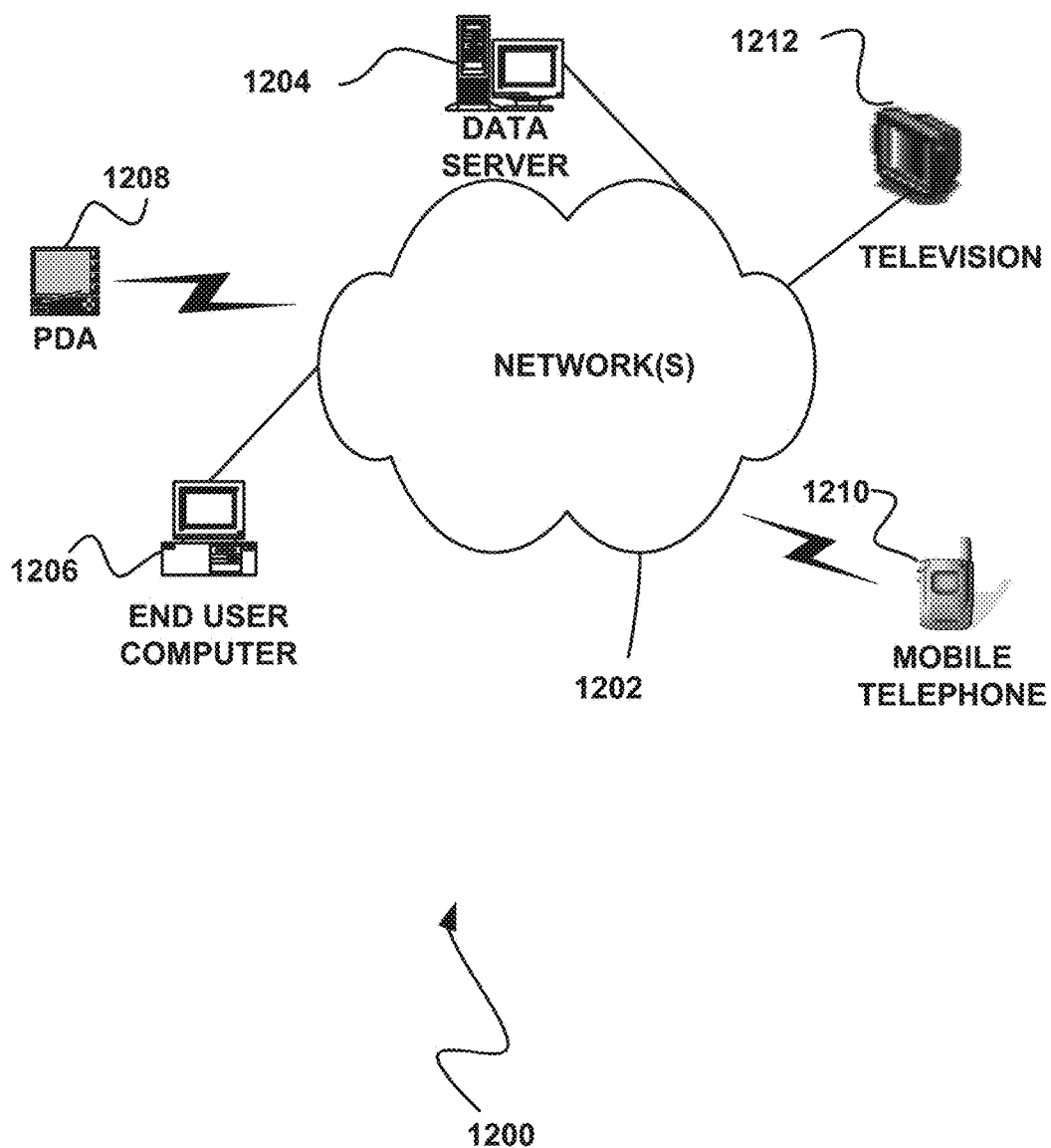
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network. 1202 including a personal digital assistant (PDA) device 1208, a mobile phone device 1210, a television 1212, etc.

Figure 13:
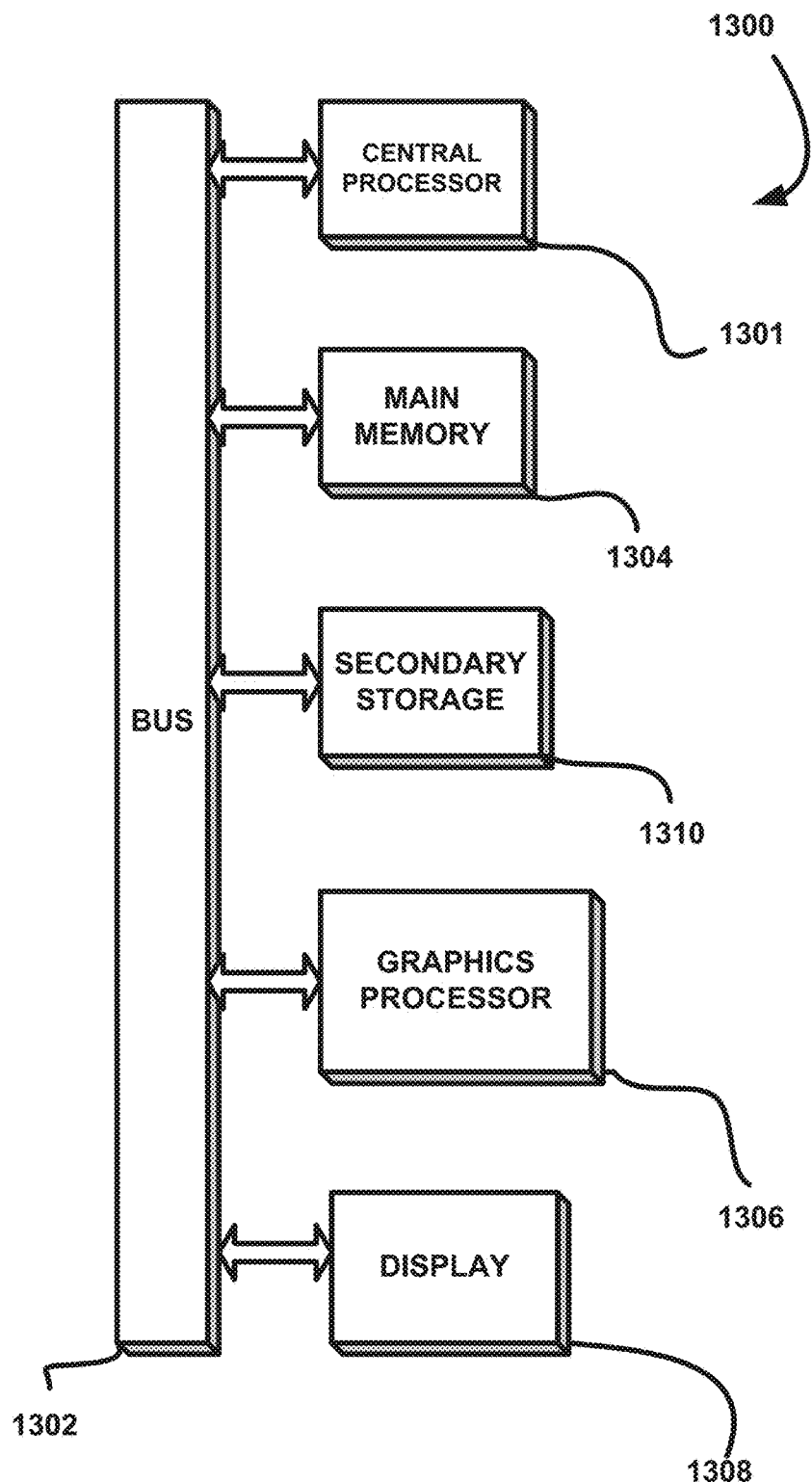
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving network traffic associated with at least one communication network;
   computer code for characterizing and classifying the network traffic based on similarities in the network traffic utilizing one or more real-time clustering algorithms including:
      creating clusters for each feature in the network traffic with each feature being clustered independently from each other feature, wherein results of creating the clusters for each feature in the network traffic are represented in a matrix with each row vector in the matrix representing a cluster definition and containing a norm for each time unit, and wherein the matrix includes as many rows as clusters found in the network traffic, and
      applying a normalizing function to the matrix to generate a real number; and
   computer code for detecting and measuring changes in network behavior of the at least one communication network utilizing information associated with the classified network traffic.

2. The computer program product of claim 1, wherein the computer program product is operable such that a combination of time units are selected to generate a plurality of periods and associated information that are stored in a time window matrix.

3. The computer program product of claim 2, wherein the computer program product is operable such that a similarity score is calculated between each feature from a current time period and a previous time period.

4. The computer program product of claim 3, wherein the computer program product is operable such that the similarity score is used to profile the network traffic in real time and to determine how different current network traffic is compared to an expected behavior of the network traffic.

5. The computer program product of claim 3, wherein the computer program product is operable such that the similarity score is used to detect dangerous network traffic in early stages.

6. The computer program product of claim 1, wherein the computer program product is operable such that characterizing and classifying the network traffic based on similarities in the network traffic utilizing the one or more real-time clustering algorithms includes modeling the network traffic of the at least one communications network in numerical matrices.

7. The computer program product of claim 1, wherein the computer program product is operable such that characterizing and classifying the network traffic based on similarities in the network traffic utilizing the one or more real-time clustering algorithms includes encapsulating the network traffic in windows of time and expressing the network traffic in at least one algebraic expression.

8. The computer program product of claim 1, wherein the computer program product is operable such that characterizing and classifying the network traffic based on similarities in the network traffic utilizing the one or more real-time clustering algorithms includes calculating a similarity between past behavior of the at least one communication network and present behavior of the at least one communication network in real time.

9. The computer program product of claim 1, wherein the computer program product is operable such that characterizing and classifying the network traffic based on similarities in the network traffic utilizing the one or more real-time clustering algorithms includes calculating a delta representing a distance between an expected behavior of the at least one communication network and an observed behavior of the at least one communication network.

10. The computer program product of claim 1, wherein the computer program product is operable such that characterizing and classifying the network traffic based on similarities in the network traffic utilizing the one or more real-time clustering algorithms includes calculating a degree of similarity of current network traffic and previously identified network traffic types.

11. The computer program product of claim 1, wherein the computer program product is operable such that characterizing and classifying the network traffic based on similarities in the network traffic utilizing the one or more real-time clustering algorithms includes executing a plurality of clustering processes in parallel, one clustering process per feature of the network traffic, to provide a level of dependency among variables included in the network traffic.

12. The computer program product of claim 1, further comprising computer code for generating a grade of accuracy of the classification of the network traffic.

13. The computer program product of claim 1, wherein the computer program product is operable such that detecting and measuring changes in the network behavior of the at least one communication network utilizing the classified network traffic includes detecting concept drift situations and distinguishing novelty from anomaly.

14. A method, comprising:
receiving network traffic associated with at least one communication network;
characterizing and classifying the network traffic based on similarities in the network traffic utilizing one or more real-time clustering algorithms, including:
creating clusters for each feature in the network traffic with each feature being clustered independently from each other feature, wherein results of creating the clusters for each feature in the network traffic are represented in a matrix with each row vector in the matrix representing a cluster definition and containing a norm for each time unit, and wherein the matrix includes as many rows as clusters found in the network traffic, and
applying a normalizing function to the matrix to generate a real number; and
detecting and measuring changes in network behavior of the at least one communication network utilizing information associated with the classified network traffic.

15. A system, comprising:
a memory system; and
one or more processing cores coupled to the memory system and that are each configured to:
receive network traffic associated with at least one communication network;
characterize and classify the network traffic based on similarities in the network traffic utilizing one or more real-time clustering algorithms, including:
creating clusters for each feature in the network traffic with each feature being clustered independently from each other feature, wherein results of creating the clusters for each feature in the network traffic are represented in a matrix with each row vector in the matrix representing a cluster definition and containing a norm for each time unit, and wherein the matrix includes as many rows as clusters found in the network traffic, and
applying a normalizing function to the matrix to generate a real number; and
detect and measure changes in network behavior of the at least one communication network utilizing information associated with the classified network traffic.

* * * * *